May 14, 1968   H. HAESELER ET AL   3,383,171

PROCESS FOR SPLITTING WASTE SULFURIC ACIDS

Original Filed Dec. 11, 1964

INVENTORS:
HARKE HAESELER, FRANZ RÜBSAM

BY

*Burger, Dinklage & Sprung*
ATTORNEY

United States Patent Office 3,383,171
Patented May 14, 1968

3,383,171
PROCESS FOR SPLITTING WASTE
SULFURIC ACIDS
Harke Haeseler and Franz Rübsam, Leverkusen, Germany, assignors to Farbenfabriken Bayer Aktiengesellschaft, Leverkusen, Germany, a corporation of Germany
Continuation of application Ser. No. 417,674, Dec. 11, 1964. This application Sept. 16, 1966, Ser. No. 583,491
Claims priority, application Germany, Jan. 2, 1964,
F 41,663
8 Claims. (Cl. 23—177)

ABSTRACT OF THE DISCLOSURE

Thermal decomposition of waste sulfuric acid into $SO_2$ and $H_2O$, using thermal energy supplied by an exothermic auxiliary chemical reaction, by feeding a mixture of sulfuric acid together with the stoichiometric amount of a fuel axially into one end of an elongated mixing and reaction zone and an oxidizing gas tangentially into the opposite end of said zone sufficient to achieve a reverse flow of said mixture and high tubulence of said mixture and said gas in said zone, and burning said mixture with at least the stoichiometric amount of said oxidizing gas in said zone under high turbulence at temperatures of about 650–1000° C. in the absence of a catalyst, for a residence time of the reactants and of the reaction products in the zone of below 1 second.

---

Figure 1:
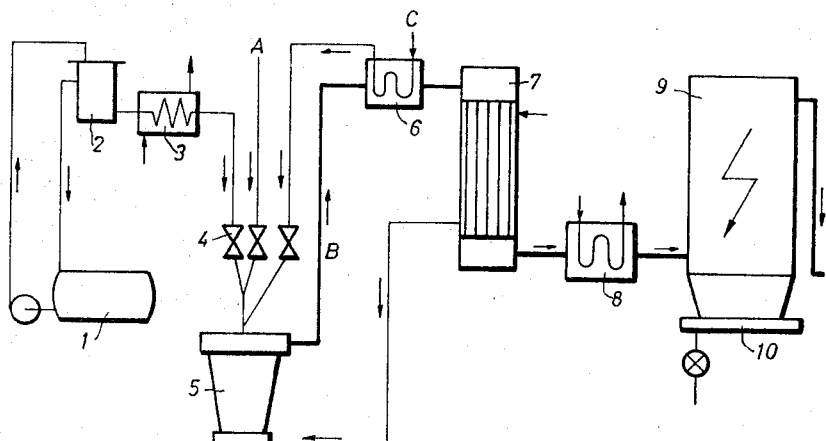

This is a streamlined continuation of copending parent application, Ser. No. 417,674, filed Dec. 11, 1964, now abandoned.

This invention relates to the thermal decomposition of waste sulfuric acids.

In various chemical processes, large quantities of more or less dilute sulfuric acids are obtained as waste acids, which are contaminated both by organic substances (such as sulfonic acids, dyestuffs and their preliminary products, etc.) and/or by inorganic compounds (especially by alkali metal sulfates).

These waste acids obtained in the production of organic intermediate products and dyestuffs and in the petroleum chemistry industry etc. cannot always be re-converted into a form suitable for use by the known methods of purification and concentration such as processes using immersion heaters, distillation, extraction or evaporation.

It is known to decompose such acids into $SO_2$ and $H_2O$ by thermal decomposition at temperatures of 250 to 1100° C., the organic compounds either being removed by combustion or being at least partially coked. The $SO_2$ obtained is generally dried by the usual processes after a further combustion to remove the gaseous carbon constituents and then purified and worked up to yield sulfuric acid. In other cases, the $SO_2$ obtained is liquefied or re-converted in some other manner to sulfites etc. Numerous processes have become known for treating the waste acids obtained in the refining of petroleum, so-called sludge acids which contain relatively large proportions of carbon. These processes can generally be subdivided into high temperature and low temperature processes.

There is described for example a process in which sludge acids are mixed in a rotary furnace with filling bodies such as sand, coke or iron balls. The filling bodies are preheated to temperatures of about 800° C. Most of the organic constituents are coked and removed together with the filling bodies. The petroleum coke is used partly to reheat the filling bodies in a second process. A similar low temperature process in which the actual decomposition takes place at temperatures of 200 to 600° C. has been proposed, too.

Relatively dilute waste acids can be decomposed according to another known process in a shaft furnace, the acids together with coke oven gas being injected into a blast flame arranged perpendicularly to the burners. The decomposition takes place at temperatures of up to 1000° C. Even higher temperatures are employed according to other proposals.

The processes described above have various disadvantages. Firstly, there is a considerable expenditure in apparatus in some cases. In many cases, the gases must be conducted to an additional combustion in order to free the gases produced in the decomposition from volatile carbon compounds such as CO and hydrocarbons. In the decomposition carried out with coking of the organic constituents, part of the sulfur is carried away with the coke. The expenditure in energy is considerable. In order to shift the equilibrium largely in favour of the formation of $SO_2$, it is necessary either to employ very high temperatures or to work under strongly reducing conditions at low temperatures, with consequent poor utilization of the fuels. The expenditure in energy is especially high when the waste acids contain only small quantities of organic materials but high proportions of inorganic materials. In cases where the acids to be decomposed are not very highly concentrated, the gases obtained have such a low content in $SO_2$ that according to the present state of the art they can no longer be economically worked up by the contact process, with the result that additional sulfur or materials containing sulfur must be added to the combustion in order to increase the $SO_2$ concentration. However, in some cases it is not desirable to couple the working up of waste sulfuric acids with an increased sulfuric acid production.

It is therefore an object of the present invention to provide a process for the decomposition of waste sulfuric acids which is highly economical, using about the stoichiometric quantity of fuel necessary for the thermal decomposition. It is another object of the present invention to provide a process for the decomposition of waste sulfuric acids which yields an $SO_2$-gas containing no $SO_3$ or only unessential traces thereof. It is a further object of the present invention to provide a process for the decomposition of waste sulfuric acids wherein the combustible contaminations of said acids are completely bound to $CO_2$ and $H_2O$. It is still another object of the present invention to provide a process for the decomposition of waste sulfuric acids, wherein the inorganic contaminations are obtained in the form of a dry dust.

Still further objects will become apparent as the following description proceeds.

A process has now been found for the thermal decomposition of waste sulfuric acids into $SO_2$ and $H_2O$, wherein the thermal energy is supplied by an exothermic auxiliary chemical reaction, which comprises burning said sulfuric acid together with the stoichiometric amount of a fuel and at least the stoichiometric amount of an oxidizing gas in a mixing and reaction zone with high turbulence and at temperatures of between 650 to 1000° C., preferably at temperatures between 800 and 900° C., whereby the residence time of the reactants as well as of the reaction products in said zone is below one second.

In a preferred embodiment of the present process the waste sulfuric acid is mixed before entering the combustion chamber with an amount of a carbon-containing fuel, necessary for the thermal energy supply of the decomposition. In case the waste sulfuric acids contain organic materials as contaminations the addition of fuel is reduced or even omitted.

If sulfuric acids of lower concentrations are to be decomposed and/or decomposition gases with a high $SO_2$-content are to be produced the carbon-containing fuel can be replaced at least partially by sulfur. In this case liquid sulfur is injected preferably together with preheated air into the reaction zone and preferably in a flow direction reverse to the flow direction of the other reactants.

On using sulfur as fuel the addition of the carbon-containing fuel is correspondingly balanced according to the energy requirements of the decomposition reaction. It is even possible to supply the necessary thermal energy by the combustion of sulfur only. This specific embodiment of the present process is preferably applicable to dilute waste sulfuric acids containing organic substances as impurities; for it is preferred—to prevent the formation of $SO_3$ as far as possible—to perform the decomposition in the presence of a small amount of carbonaceous materials, which amount should not be lower than about 5% referred to the total amount of the necessary fuel.

Surprisingly, it was found that complete decomposition of sulfuric acid takes place without formation of $SO_3$ in the process according to the invention, even at the relatively low temperatures mentioned above and, in contrast to the low temperature processes hitherto employed, the organic constituents are completely oxidized to $CO_2$ and $H_2O$. Furthermore, decomposition gases having a high $SO_2$-content are obtained even though less concentrated acids may be used. Compared with the generator gas process and the combustion in empty combustion chambers at high temperatures, the expenditure in energy is considerably lower, the saving in energy being at least 25% compared with comparable processes. A further advantage in the process is that the inorganic impurities, especially alkali metal sulfates, are obtained in the form of dry dust which will not cake and which is discharged from the chamber together with the stream of gas formed by decomposition, and these inorganic impurities can then be recovered in a useful form by known methods in adjacent apparatus.

Suitable for carrying out the instant process are any combustion chambers in which the acid to be decomposed can be mixed with air of combustion, if necessary after mixing it with the necessary fuels, in such a manner that the reaction will take place with very vigorous turbulence in a time of less than one second in the combustion chamber, the direction of flow of one of the reaction components being reversed.

The Schoppe chamber according to German published specification 1,035,306 has proved to be especially suitable for carrying out the process although any other mixing apparatus which fulfills the conditions described above is suitable. By means of the present process, waste acids of very different compositions can be decomposed. In the case of relatively dilute acids, it may be necessary to include a suitable quantity of sulfur in the combustion in order to obtain the required concentration of $SO_2$ in the gases formed by splitting. In principle, acids having an $H_2SO_4$-content of about 20–96% by weight may be used, especially suitable being acids at a concentration of about 60 to 70%.

Before their introduction into the combustion chamber, the acids are mixed with the stoichiometrical quantity of fuel required for maintaining the rate of heat production required for the decomposition.

Suitable fuels are oil, illuminating gas, water gas, lignite dust, organic impurities contained in the waste acids and any other suitable fuels. When calculating the fuel requirement, the quantity of organic impurities contained in the waste acids is taken into account.

The fuels may be partly or completely replaced with sulfur according to the desired $SO_2$-concentration. The sulfur is advantageously injected separately in liquid form together with preheated air to be used for combustion. Owing to the low energy requirement of the new process, for a given composition of waste acid about 25% less sulfur is oxidized to obtain the same end concentration of $SO_2$ than in processes employing a temperature of 1100° C.

The quantity of oxygen required is preferably supplied in the form of preheated air; it is possible to work with the stoichiometric quantity of oxygen required for combustion. In other words it is not necessary to use less than the equivalent amount of oxygen in order to maintain a reducing atmosphere. It is even possible to use an excess of oxygen such as is necessary, for example, for the reaction of the decomposition gases in the contact process, without any formation of $SO_3$ taking place during the decomposition.

The process is advantageously carried out at a temperature of about 850° C. It is surprising that at this temperature the organic constituents, including the fuels supplied, are completely oxidized and a decomposition gas is obtained which is practically free from $SO_3$. This result was not to be expected, firstly because the stoichimetrically required quantity of oxygen or even an excess of oxygen is employed and secondly because theoretically, at temperatures of 850° C. approximately 7 parts of $SO_3$ were expected to be formed for every 93 parts of $SO_2$ under the given conditions.

Figure 2:
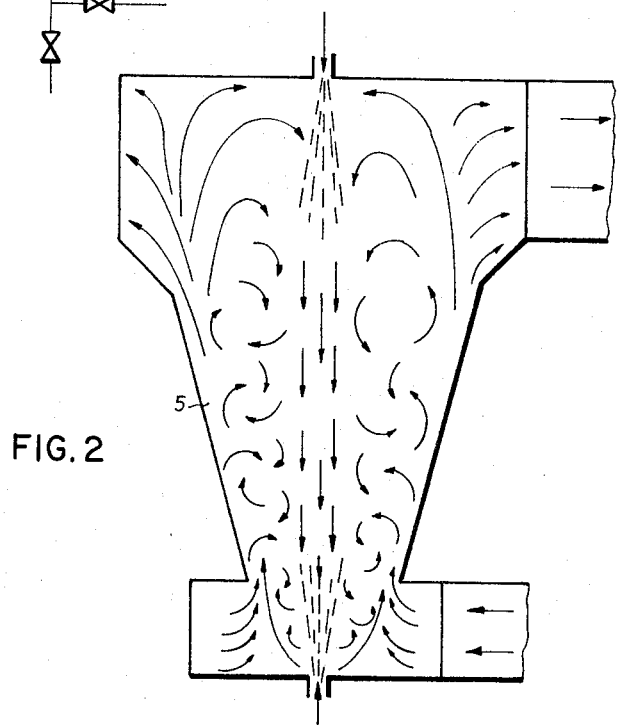

In a preferred method of carrying out the instant process in the Schoppe chamber, as shown in FIGURE 2, the waste acid is mixed with the fuel and injected axially by means of preheated air into one end (i.e., the discharge end) of the combustion chamber where, as a result of vigorous turbulence, such mixture is mixed with the preheated air of combustion which enters tangentially into the opposite end of said chamber, whereby to achieve a reverse flow of said mixture and high turbulence of said mixture and said tangentially fed air in said chamber, such that the waste acid is oxidized and split up into $SO_2$ and $H_2O$. In this very advantageous method of carrying out the instant process, the waste sulfuric acid obtained is automatically mixed with the necessary quantity of fuel before decomposition and with the necessary quantity of sulfur during the decomposition process itself, the mixing ratio being controlled solely by the $SO_2$-concentration in the gas formed by decomposition if the temperature is kept constant.

A suitable device for performing the present process, wherein the carbon-containing fuel is partially substituted by sulfur fuel, is described in FIGURES 1 and 2.

The waster sulfuric acid as shown in FIG. 1 is pumped from the container 1 via a levelling tank 2 and a heating assembly 3 through a mixing valve 4 into the decomposition chamber 5. The decomposition gas leaves the decomposition chamber via pipe B and is fed through heat exchangers 6, 7 and 8 into a hot EGR (electrostatic dust separator) 9. Heat exchanger 7 can be a waste heat boiler. The solid particles are removed by riddles 10. The fuel is fed in via pipe A and admixed with the acid in mixing valve 4. Air is preheated in heat exchanger 6 and charged into the decomposition chamber by pipe C. Liquid sulfur is charged from below into the chamber, admixed with air heated in heat exchanger 7.

The application will be further explained below by means of examples.

EXAMPLE 1

A container 1 contains a concentrate of waste sulfuric acid which was obtained in an immersion heater plant by concentrating a mixture of waste sulfuric acids obtained from various plants producing organic intermediate products. This concentrate has the following composition:

| | Percent |
|---|---|
| $H_2O$ | 25 |
| $H_2SO_4$ | 60 |
| $Na_2SO_4$ | 11 |
| Salts of organic sulfacids | 4 |

The waste acid is pumped into a levelling tank 2 and flows from there through a heating assembly 3 and a mixing valve 4 in which it is mixed with the stoichiometrical quantity of fuel oil (in this example 13 kg. of fuel oil to 100 kg. of $SO_3$ from the waste acid). It flows to a nozzle in which it flows down axially and is mixed with the air of combustion which has been preheated to 600° C. in the heat exchanger 6, to be atomized into the mixing chamber 5. Elementary sulfur is introduced into the bottom of the mixing chamber to be oxidized with air of combustion preheated to 600° C., 8.5 kg. of sulfur being used in this example for 100 kg. of $SO_3$ from the waste acid and 13 kg. of fuel oil. The quantity of sulfur in the gas obtained by the thermal decomposition can be controlled by an $SO_2$ recorder so that a given concentration of $SO_2$ is maintained in the gas formed by splitting.

This gas flows through the heat exchanger 6 into a waste heat boiler 7, then through the heat exchanger 8 and finally through a hot EGR 9 in which the $Na_2SO_4$ is deposited in the form of dust and removed by riddles. From there, the gas flows through a cooling tower into a drying plant and after the addition of air it is conveyed to a contact or double contact process.

When the reaction is carried out under these conditions, a decomposition temperature of 850° C. is established. The dry gas formed by decomposition contains 12% of $SO_2$ and 4.7% of $O_2$.

EXAMPLE 2

Conditions are as described in Example 1, except a waste sulfuric acid concentrate of the following composition is used:

|  | Percent |
|---|---|
| $H_2O$ | 25 |
| $H_2SO_4$ | 60 |
| $Na_2SO_4$ | 15 |

In this example, 20 kg. of fuel oil were added per 100 kg. of $SO_3$, and an additional 10.5 kg. of sulfur were oxidized. The gas formed by decomposition contained 12% of $SO_2$ and 4.7% of $O_2$.

EXAMPLE 3

Conditions are as described in Example 1, except a waste sulfuric acid concentrate of the following composition is used:

|  | Percent |
|---|---|
| $H_2O$ | 30 |
| $H_2SO_4$ | 70 |

In this example, 20 kg. of fuel oil were added per 100 kg. of $SO_3$ from the waste acid, and an additional 6.8 kg. of sulfur were oxidized. The dry gas obtained from decomposition contained 11.9% of $SO_2$ and 5% of $O_2$.

EXAMPLE 4

Under the conditions as described in Example 1, a waste sulfuric acid of the composition

|  | Percent |
|---|---|
| $H_2O$ | 26 |
| $H_2SO_4$ | 61 |
| Organic constituents | 13 | was decomposed. No fuel oil was added but an additional 9.2 kg. of sulfur were oxidized per 100 kg. of $SO_3$ from the above waste sulfuric acid. The composition temperature was 900° C. The dry gas obtained from decomposition contained 12% of $SO_2$ and 4.9% of $O_2$.

What is claimed is:

1. Process for the thermal decomposition of waste sulfuric acid into $SO_2$ and $H_2O$, wherein the thermal energy is supplied by an exothermic auxiliary chemical reaction, which comprises feeding a mixture of sulfuric acid together with the stoichiometric amount of a fuel axially into one end of an elongated mixing and reaction zone and an oxidizing gas tangentially into the opposite end of said zone sufficient to achieve a reverse flow of said mixture and high turbulence of said mixture and said gas in said zone, and burning said mixture with at least the stoichiometric amount of said oxidizing gas in said mixing and reaction zone under said high turbulence at temperatures of between 650 to 1000° C. in the absence of a catalyst, for a residence time of the reactants as well as of the reaction products in said zone of below one second.

2. Process according to claim 1, wherein the waste sulfuric acid has a concentration of between 20–96% by weight.

3. Process according to claim 1, wherein the temperature in said mixing and reaction zone is between 800 and 900° C.

4. Process for the thermal decomposition of waste sulfuric acid into $SO_2$ and $H_2O$, wherein the thermal energy is supplied by an exothermic auxiliary chemical reaction, which comprises mixing said sulfuric acid with the stoichiometric amount of a carbon-containing fuel, feeding said mixture axially into one end of an elongated reaction zone of unobstructed flow cross-section and an oxidizing gas tangentially into the opposite end of said zone sufficient to achieve a reverse flow of said mixture and high turbulence of said mixture and said gas in said zone, decomposing said mixture in said zone with said high turbulence together with an at least stoichiometric amount of said oxidizing gas at temperatures of between 650 to 1000° C. in the absence of a catalyst, for a residence time of the reactants as well as of the reaction products in said zone of below one second, said reaction mixture being recovered from the end of said zone into which said sulfuric acid and fuel are fed immediately after said residence time.

5. Process according to claim 4, wherein the waste sulfuric acid has a concentration of between 60–70% by weight.

6. Process according to claim 4, wherein the temperature in said reaction zone is of between 800 to 900° C.

7. Process according to claim 4, wherein the carbon-containing fuel is at least partially substituted by sulfur, the sulfur being fed axially into said opposite end of the reaction zone in molten form in a flow direction axially reverse to the flow direction of said mixture of sulfuric acid and fuel being fed into said one end of said zone.

8. Process according to claim 7, wherein at least 5% of said carbon-containing fuel is used.

References Cited

UNITED STATES PATENTS

| 2,097,271 | 10/1937 | Debuch et al. | 23—177 |
| 2,406,890 | 9/1946 | Mohr | 23—177 |
| 2,935,840 | 5/1960 | Schoppe | 60—35.6 |

EWARD J. MEROS, *Primary Examiner.*

OSCAR R. VERTIZ, *Examiner.*

A. J. GREIF, *Assistant Examiner.*